United States Patent
Weber

(10) Patent No.: US 6,182,438 B1
(45) Date of Patent: Feb. 6, 2001

(54) METHOD AND APPARATUS FOR STARTING A GAS TURBINE ENGINE

(75) Inventor: Gregory B. Weber, Aurora, NY (US)

(73) Assignee: Moog Inc., East Aurora, NY (US)

( * ) Notice: Under 35 U.S.C. 154(b), the term of this patent shall be extended for 0 days.

(21) Appl. No.: 09/349,539

(22) Filed: Jul. 8, 1999

(51) Int. Cl.$^7$ ....................................................... F02C 7/26
(52) U.S. Cl. ........................................ 60/39.06; 60/39.141
(58) Field of Search ............................... 60/39.06, 39.141

(56) References Cited

U.S. PATENT DOCUMENTS

| | | | |
|---|---|---|---|
| 5,305,596 | * 4/1994 | Lampe et al. | 60/39.06 |
| 5,369,948 | * 12/1994 | Vertens et al. | 60/39.02 |
| 5,966,925 | * 10/1999 | Torikai et al. | 60/39.06 |

\* cited by examiner

Primary Examiner—Timothy S. Thorpe
Assistant Examiner—Ehud Gartenberg
(74) Attorney, Agent, or Firm—Phillips, Lytle, Hitchcock, Blaine & Huber LLP

(57) ABSTRACT

A method of starting gas turbine engine (17) having a variable-speed motor-driven pump (13) operatively arranged to supply a source of fuel to the engine through at least one combustor nozzle (19) when the engine is operating normally, includes the steps of: providing a calibration orifice (16) sized to simulate the pressure-flow characteristics of the nozzle; initially directing the flow from the pump through the orifice; operating the pump at preselected speeds; measuring the temperature of the flow at each of such speeds; measuring the pressure drop of the flow across the orifice at each of such speeds; calculating the fuel mass flow rate as a function of pump speed and temperature; thereafter redirecting the flow from the orifice to the nozzle; and subsequently controlling the speed of the pump to produce a desired fuel mass flow rate for starting the engine.

2 Claims, 1 Drawing Sheet

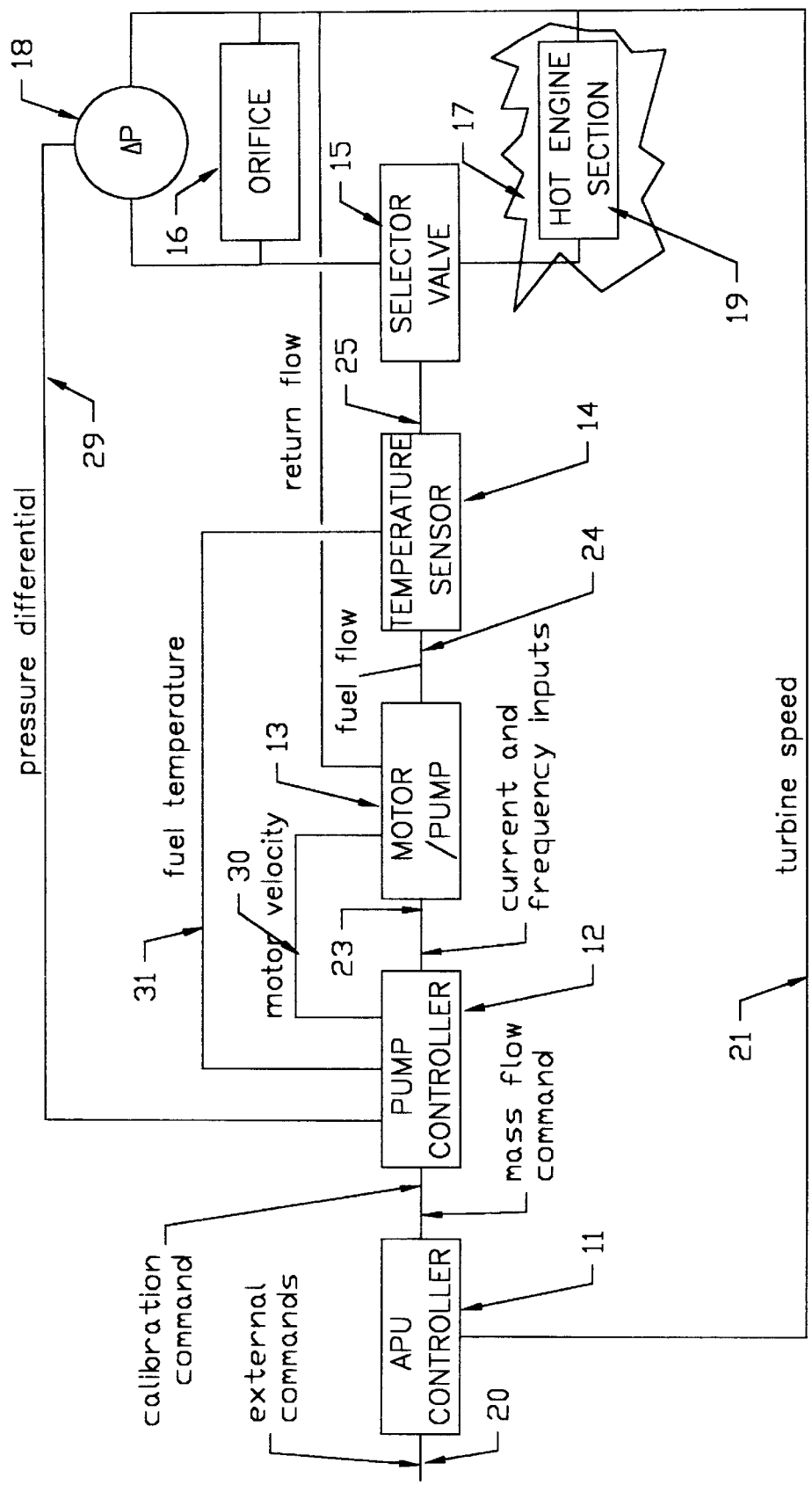

METHOD AND APPARATUS FOR STARTING A GAS TURBINE ENGINE

TECHNICAL FIELD

The present invention relates generally to a method and apparatus for starting a gas turbine engine, and, more particularly, to an improved method and apparatus for first simulating the anticipated running conditions of the engine during a calibration mode, and for subsequently operating the engine during an operational mode.

BACKGROUND ART

Small gas turbine engines, such as those used as auxiliary power units ("APU"), are normally controlled by metering the output of a fixed displacement fuel pump that is driven at a constant fraction of engine speed through a geared transmission. The metered flow rate is typically controlled through an engine speed control loop to achieve the desired engine power setting. In such systems, excess fuel pump output is typically bypassed across a relief valve, and constitutes a significant inefficiency.

During engine start up, it is necessary to control the mass flow rate of fuel from the engine-driven pump without the benefit of an engine speed control loop, since prior to engine light-off, fuel delivery rate has no influence on engine speed. This typically requires ancillary elements, such as a pressure regulator, a metering valve and some type of flow-measuring instrument. All of these elements add significant cost to the engine control system. Moreover, mass flow rate is a function of temperature, a variable that can quickly change. For example, a commercial jetliner may quickly move from one location, at which the tarmac temperature may exceed, say, 100° F., to another location at which the ambient temperature is less, say, than 32° F. It is common to operate the APU while the aircraft is being serviced at the gate. However, the mass flow rate of fuel necessary to start the APU will have to be adjusted for differences in the ambient temperature.

Accordingly, it would be generally desirable to provide an improved method and apparatus for starting a gas turbine engine that would omit the need for these elements. By omitting these, the overall cost of the engine control system can be reduced. Additionally, if such a simplified system were also to permit fuel pump speed to be controlled independently from that of the engine, then improved power efficiency during normal engine operation would also be realized.

DISCLOSURE OF THE INVENTION

The improved method and apparatus disclosed herein contemplates initially calibrating the fuel flow vs. motor speed characteristics when operated with the pump discharge directed through an orifice sized to accurately simulate the pressure/flow characteristics of the engine primary combustor nozzles. Various pump speeds are commanded by a pump controller and the resulting orifice pressure drops are recorded, along with fuel temperature. This data is then processed by the pump controller to establish a relationship between pump speed and mass flow rate.

The calibration orifice is then switched out of the pump flow circuit, and the flow is redirected to the engine combustor nozzles so that the pump controller can set the desired mass flow rate based on the calibration data. After engine light-off, the engine controller transitions to its normal operating mode, in which pump speed is modulated in response to an outer control loop that is closed on turbine speed. This system thus economically compensates for variations in pump performance with temperature and wear.

With parenthetical reference to the corresponding parts, portions or surfaces of the disclosed embodiment, merely for purposes of illustrations and not by way of limitation, the present invention broadly provides an improved method and apparatus for starting a gas turbine engine.

In one aspect, the invention provides an improved method of starting a gas turbine engine (17) having a variable-speed motor-driven pump (13) operatively arranged to supply fuel from a source to the engine through a combustor nozzle (19) when the engine is operated normally. The improved method comprises the steps of: providing a calibration orifice (16) sized to simulate the pressure-flow characteristics of the nozzle; initially directing the flow from the pump through the orifice; operating the pump at preselected speeds; measuring the temperature of the flow at each of the speeds; measuring the pressure drops of the flow across the orifice at each of the speeds; calculating the fuel mass flow rate as a function of pump speed and temperature; selectively directing flow through the combustor nozzle rather than the orifice; and controlling the speed of the pump to produce a desired mass flow rate for starting the engine.

In another aspect, the invention provides improved apparatus (10) for defining the mass flow rate output of a motor-driven variable-speed fuel pump (13) as a function of pump speed during start up of a gas turbine engine (17). The improved apparatus comprises: at least one combustor nozzle (19); a calibration orifice (16) sized to simulate the pressure/flow characteristics of the nozzle; a valve (15) for selectively directing the flow to either the nozzle or the orifice; a controller (12) for operating the pump at various speeds; a temperature sensor (14) for measuring the temperature of the pump output flow; a pressure sensor (18) for measuring the pressure drop of the pump output flow across the orifice at different speeds; and means (12) for calculating the mass flow rate of the pump output flow as a function of pump speed; whereby the pump may be controlled to produce a mass flow rate.

Accordingly, the general object of the invention is to provide an improved method of, and apparatus for, starting a gas turbine engine.

Another object is to provide an improved method and apparatus for starting a gas turbine engine in which the mass flow rate of fuel delivered by a pump is determined as a function of pump speed and fuel temperature, such that approximately-correct quantities of fuel may be delivered to the engine during start up.

These and other objects and advantages will become apparent from the foregoing and ongoing written specification, the drawings, and the appended claims.

BRIEF DESCRIPTION OF THE DRAWING

FIG. 1 is a schematic block diagram of the improved apparatus, showing the various component parts thereof and the various signal paths therebetween.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up", and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis or elongation, or axis of rotation, as appropriate.

Referring now to the drawing, the present invention broadly provides an improved method and apparatus for starting a gas turbine engine. This engine might, for example, be the APU of a commercial jet liner. However, the invention is not limited to this end use, and may be generally employed with respect to start-up of appropriate gas turbine engines.

In FIG. 1, the improved apparatus, generally indicated at 10, is shown as broadly including an APU controller 11, a pump controller 12, a motor-driven variable-speed pump 13, a temperature sensor or transducer 14, a selector valve 15, an orifice 16, and a differential pressure sensor 18. The apparatus is shown associated with the combustor nozzles, indicated in block 19 of a gas turbine engine.

The APU controller 11 is supplied with external commands via line 20. The APU controller receives a turbine speed negative feedback signal from the engine via line 21. The algebraic sum of these two signals is provided as an error signal via line 22 to the pump controller. The pump controller supplies signals of appropriate current and frequency via line 23 to the pump 13, which, in turn, supplies fuel, represented by line 24, to the temperature sensor, and then by line 25 to selector valve 15. The selector valve may direct the flow of fuel to either orifice 16 or the engine combustor nozzle(s) 19. Any return flow from the orifice is returned to the motor pump by line 26. The sensed temperature of the fuel flow is supplied via line 31 to the component controller. The pressure differential across the orifice is determined by differential pressure sensor 18, and is supplied to the component controller via line 29. The motor velocity (i.e., speed and direction) is supplied from the pump to the pump controller via line 30. The fuel temperature is provided from sensor 14 to pump controller 12 via line 31.

As indicated above, the present invention provides an improved method of, and apparatus for, starting a gas turbine engine having a variable-speed motor-driven pump, such as indicated at 13, operatively arranged to supply fuel from a suitable source (not shown) to an engine through a combustor nozzle, indicated at 19, when the engine is operated normally. The improved method broadly includes the steps of: providing a calibration orifice, such as indicated at 16, that has been sized (i.e., so dimensioned and configured) to simulate the pressure-flow characteristics of combustor nozzle 19; initially directing the fuel flow from the pump through the orifice; operating the pump at preselected speeds provided by pump controller 12; measuring, as by sensor 14, the temperature of the fuel flow at each of the preselected speeds; measuring the pressure drop of the flow across the orifice, as by differential pressure sensor 18, at each of the speeds; calculating the mass flow rate of the fuel as a function of pump speed and fuel temperature; thereafter re-directing the flow of fuel from the orifice to the combustor nozzles, as by the operation of two-position selector valve 15; controlling pump speed in accordance with the calculated means flow derived from the calibration data so as to supply the desired flow for engine start-up; and thereafter controlling the speed of the pump by an outer turbine speed control loop to control the desired mass flow rate for starting the engine.

In another aspect, the invention provides improved apparatus for defining the mass flow rate output of a motor-driven variable-speed fuel pump as a function of pump speed during start-up of a gas turbine engine. This apparatus broadly includes: a combustor nozzle, such as indicated at 19; a calibration orifice, indicated at 18, that has been so dimensioned and configured (i.e., sized) to simulate the pressure-flow characteristics of the nozzle; a selector valve, such as indicated at 15, for selectively directing the flow to either the nozzle or to the orifice; a pump controller, such as indicated at 12, for operating the pump at various speeds; a temperature sensor, such as indicated at 14, for measuring the temperature of the pump output flow; a pressure sensor, such as indicated at 18, for measuring the pressure drop of the fuel flow across the calibration orifice at various pump speeds; and means, such as contained within pump controller 12, for calculating the fuel mass flow rate of the pump output flow as a function of pump speed and flow temperature; whereby the pump may be operated during engine startup to produce a desired mass flow rate.

The present invention contemplates that many changes and modifications may be made. For example, while pump 13 may be driven by an electrical motor, other types of prime movers may be substituted therefor. Different types of temperature sensors and transducers may be used. Valve 18 may be a two-way solenoid-operated valve. Orifice 19 may be a simple orifice plate. Various types of differential pressure sensors are commercially available for use as the differential pressure sensor. Hence, it should be clearly understood that the present invention contemplates that various mechanisms may be used for those illustrated schematically in the enclosed drawing.

Therefore, while the presently-preferred form of the improved apparatus has been shown and described, and the method performed thereby also described, persons skilled in this art will appreciate that various additional changes and modifications may be made without departing from the spirit of the invention, as defined and differentiated by the following claims.

What is claimed is:

1. A method of starting a gas turbine engine having a variable-speed motor-driven pump operatively arranged to supply fuel from a source to said engine through a combustor nozzle when said engine is operating normally, comprising the steps of:

providing a calibration orifice sized to simulate pressure-flow characteristics of said nozzle;

selectively directing the flow from said pump through said orifice;

operating said pump at preselected speeds;

measuring the temperature of the fuel in said flow at each of said speeds;

measuring the pressure drop of said flow across said orifice at each of said speeds;

calculating the fuel mass flow rate as a function of pump speed and fuel temperature;

selectively directing said flow through said nozzle; and controlling the speed of said pump to produce a desired mass flow rate for starting said engine.

2. Apparatus for defining the mass flow rate output of a motor-driven variable-speed fuel pump as a function of pump speed during start-up of a gas turbine engine, comprising:

- a combustor nozzle;
- a calibration orifice sized to simulate pressure/flow characteristics of said nozzle;
- a valve for selectively directing said flow either to said nozzle or to said orifice;
- a controller for operating said pump at various speeds;
- a temperature sensor for measuring the temperature of the fuel in the pump output flow;
- a pressure sensor for measuring a pressure drop of said pump output flow across said orifice at various speeds; and
- means for calculating the fuel mass flow rate of said pump output flow as a function of pump speed and fuel temperature;
- whereby said pump is controlled to produce a desired mass flow rate.

* * * * *